(12) United States Patent
Tracy et al.

(10) Patent No.: US 7,871,319 B2
(45) Date of Patent: Jan. 18, 2011

(54) COMPUTER THERMAL DISSIPATION SYSTEM AND METHOD

(75) Inventors: Mark S. Tracy, Tomball, TX (US); Memphis-Zhihong Yin, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 603 days.

(21) Appl. No.: 10/980,029

(22) Filed: Nov. 3, 2004

(65) Prior Publication Data

US 2006/0094347 A1    May 4, 2006

(51) Int. Cl.
*G06F 1/20* (2006.01)
(52) U.S. Cl. .................. 454/184; 454/185; 454/195
(58) Field of Classification Search ............... 454/184, 454/185, 195; 312/236
See application file for complete search history.

(56) References Cited

U.S. PATENT DOCUMENTS

| | | | | | |
|---|---|---|---|---|---|
| 2,743,623 | A | * | 5/1956 | Wells | 74/89.39 |
| 3,120,166 | A | * | 2/1964 | Lyman | 454/307 |
| 3,317,798 | A | * | 5/1967 | Chu et al. | 361/696 |
| 4,980,848 | A | * | 12/1990 | Griffin et al. | 361/687 |
| 5,356,729 | A | * | 10/1994 | Pedicini | 429/27 |
| 5,424,913 | A | * | 6/1995 | Swindler | 361/687 |
| 5,428,503 | A | * | 6/1995 | Matsushima et al. | 361/695 |
| 5,460,441 | A | * | 10/1995 | Hastings et al. | 312/298 |
| 5,544,012 | A | * | 8/1996 | Koike | 361/695 |
| 5,552,960 | A | * | 9/1996 | Nelson et al. | 361/679.54 |
| 5,851,143 | A | * | 12/1998 | Hamid | 454/57 |
| 6,069,791 | A | * | 5/2000 | Goto et al. | 361/687 |
| 6,078,495 | A | * | 6/2000 | Cipolla et al. | 361/679.46 |
| 6,088,225 | A | * | 7/2000 | Parry et al. | 361/704 |
| 6,104,607 | A | * | 8/2000 | Behl | 361/687 |
| 6,164,369 | A | * | 12/2000 | Stoller | 165/104.33 |
| 6,168,048 | B1 | * | 1/2001 | Xu et al. | 222/1 |
| 6,175,492 | B1 | * | 1/2001 | Nobuchi | 361/679.08 |
| 6,181,557 | B1 | * | 1/2001 | Gatti | 361/695 |
| 6,186,890 | B1 | * | 2/2001 | French et al. | 454/184 |
| 6,198,628 | B1 | * | 3/2001 | Smith | 361/695 |
| 6,212,069 | B1 | * | 4/2001 | Janik et al. | 361/687 |
| 6,256,193 | B1 | * | 7/2001 | Janik et al. | 361/683 |
| 6,294,762 | B1 | * | 9/2001 | Faries et al. | 219/400 |
| 6,309,296 | B1 | * | 10/2001 | Schwenk et al. | 454/184 |
| 6,459,573 | B1 | * | 10/2002 | DiStefano et al. | 361/679.46 |
| 6,496,369 | B2 | * | 12/2002 | Nakamura | 361/697 |
| 6,502,628 | B1 | * | 1/2003 | Siahpolo et al. | 165/122 |
| 6,652,374 | B2 | * | 11/2003 | Sharp et al. | 454/184 |

(Continued)

FOREIGN PATENT DOCUMENTS

JP    S59-163683    9/1984

(Continued)

OTHER PUBLICATIONS

Japanese Office Action dated Jun. 22, 2010, pages 3.

(Continued)

*Primary Examiner*—Steven B McAllister
*Assistant Examiner*—Samantha A Miller

(57) ABSTRACT

A computer thermal dissipation system comprises a computer device having a base member and a display member where the computer device has at least one airflow door disposed on the base member adapted to be opened to facilitate thermal energy dissipation from the base member.

49 Claims, 2 Drawing Sheets

U.S. PATENT DOCUMENTS

| | | | |
|---|---|---|---|
| 6,657,859 B1 * | 12/2003 | Karr | 361/687 |
| 6,807,056 B2 * | 10/2004 | Kondo et al. | 361/689 |
| 6,816,371 B2 * | 11/2004 | Agata et al. | 361/687 |
| 6,837,785 B2 * | 1/2005 | Soderlund | 454/184 |
| 6,845,008 B2 * | 1/2005 | Pokharna et al. | 361/690 |
| 6,847,013 B2 * | 1/2005 | Audette et al. | 219/400 |
| 6,885,556 B2 * | 4/2005 | Kondo et al. | 361/699 |
| 6,909,602 B2 * | 6/2005 | Dietrich et al. | 361/687 |
| 7,120,015 B2 * | 10/2006 | Furuya | 361/687 |

FOREIGN PATENT DOCUMENTS

| | | |
|---|---|---|
| JP | 03-88850 | 4/1991 |
| JP | H05-134781 A | 6/1993 |
| JP | 08307981 | 11/1996 |
| JP | 1063474 | 3/1998 |
| JP | 11110076 | 4/1999 |
| JP | 2000-222071 A | 8/2000 |
| JP | 20026993 | 1/2002 |
| JP | 2002-271049 A | 9/2002 |
| JP | 2004310238 | 11/2004 |

OTHER PUBLICATIONS

Translation of Japanese Office Action dated Jun. 22, 2010, pages 4.

* cited by examiner

COMPUTER THERMAL DISSIPATION SYSTEM AND METHOD

BACKGROUND

Computer systems generally contain intake and/or exhaust venting for processor and system cooling. However, available surface area on such computer systems is generally minimal for locating such intake and/or exhaust venting. For example, surface areas on notebook, laptop or other types or portable computer systems are generally limited by placement of input/output ports, drive locations, and card slots. Thus, the ability to adequately cool the processor and computer system affects the performance and/or processor that may be incorporated into the computer system.

SUMMARY OF THE INVENTION

In accordance with one embodiment of the present invention, a computer thermal dissipation system comprises a computer device having a base member and a display member where the computer device has at least one airflow door disposed on the base member and adapted to be opened to facilitate thermal energy dissipation from the base member.

In accordance with another embodiment of the present invention, a computer thermal dissipation system comprises a computer device having at least one airflow door disposed in a base member thereof and adapted to automatically open in response to opening of a display member of the computer device relative to the base member.

In accordance with yet another embodiment of the present invention, a computer thermal dissipation method comprises automatically opening at least one airflow door of a computer device having a base member coupled to a display member in response to a temperature within an interior area of the base member exceeding a predetermined threshold, the airflow door disposed on the base member.

BRIEF DESCRIPTION OF THE DRAWINGS

For a more complete understanding of the present invention and the advantages thereof, reference is now made to the following descriptions taken in connection with the accompanying drawings in which.

DETAILED DESCRIPTION OF THE DRAWINGS

Figure 1:
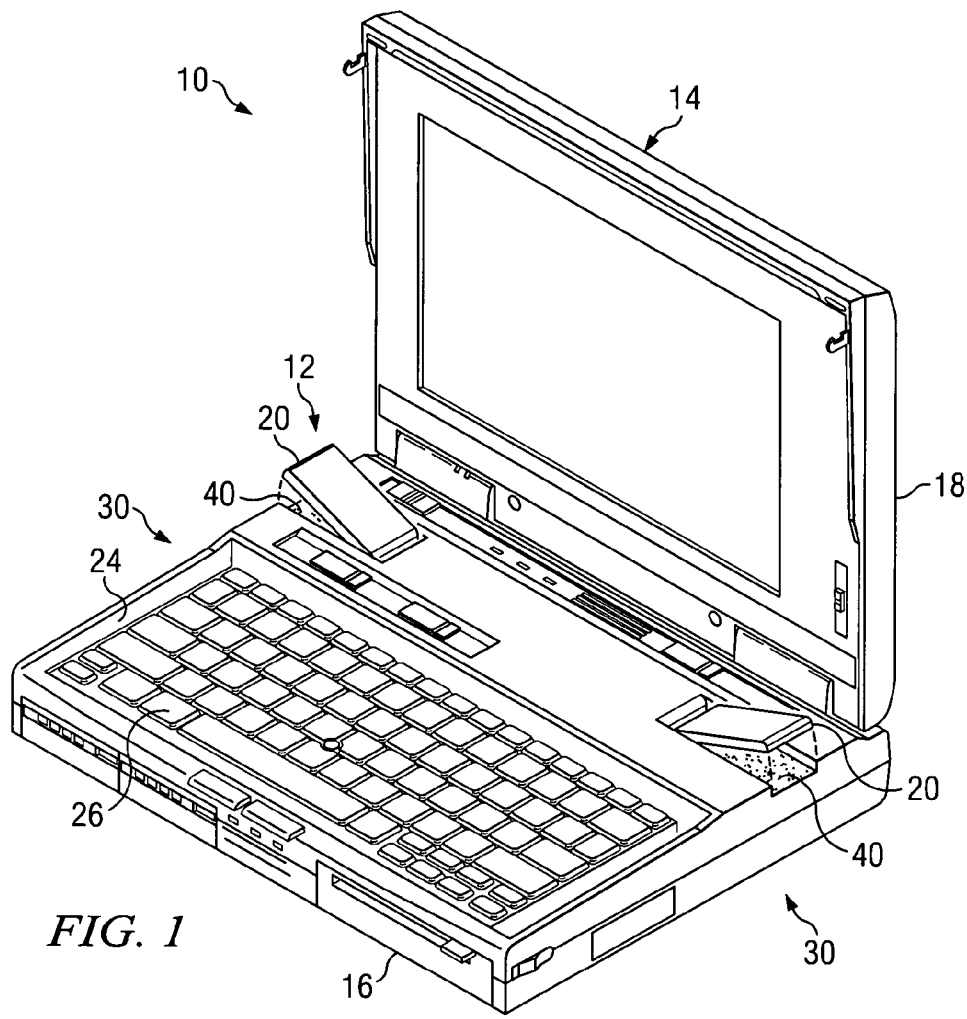
FIG. 1 is a diagram illustrating a computer device incorporating an embodiment of a computer thermal dissipation system in accordance with the present invention.
Figure 2A:
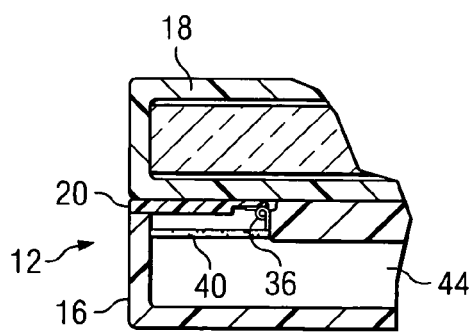
FIGS. 2A and 2B are diagrams illustrating the computer thermal dissipation system illustrated in FIG. 1 in a closed and open position, respectively.
Figure 2B:
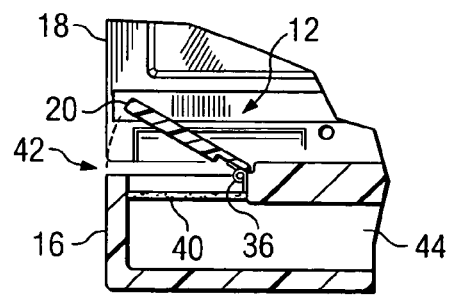
Figure 3:
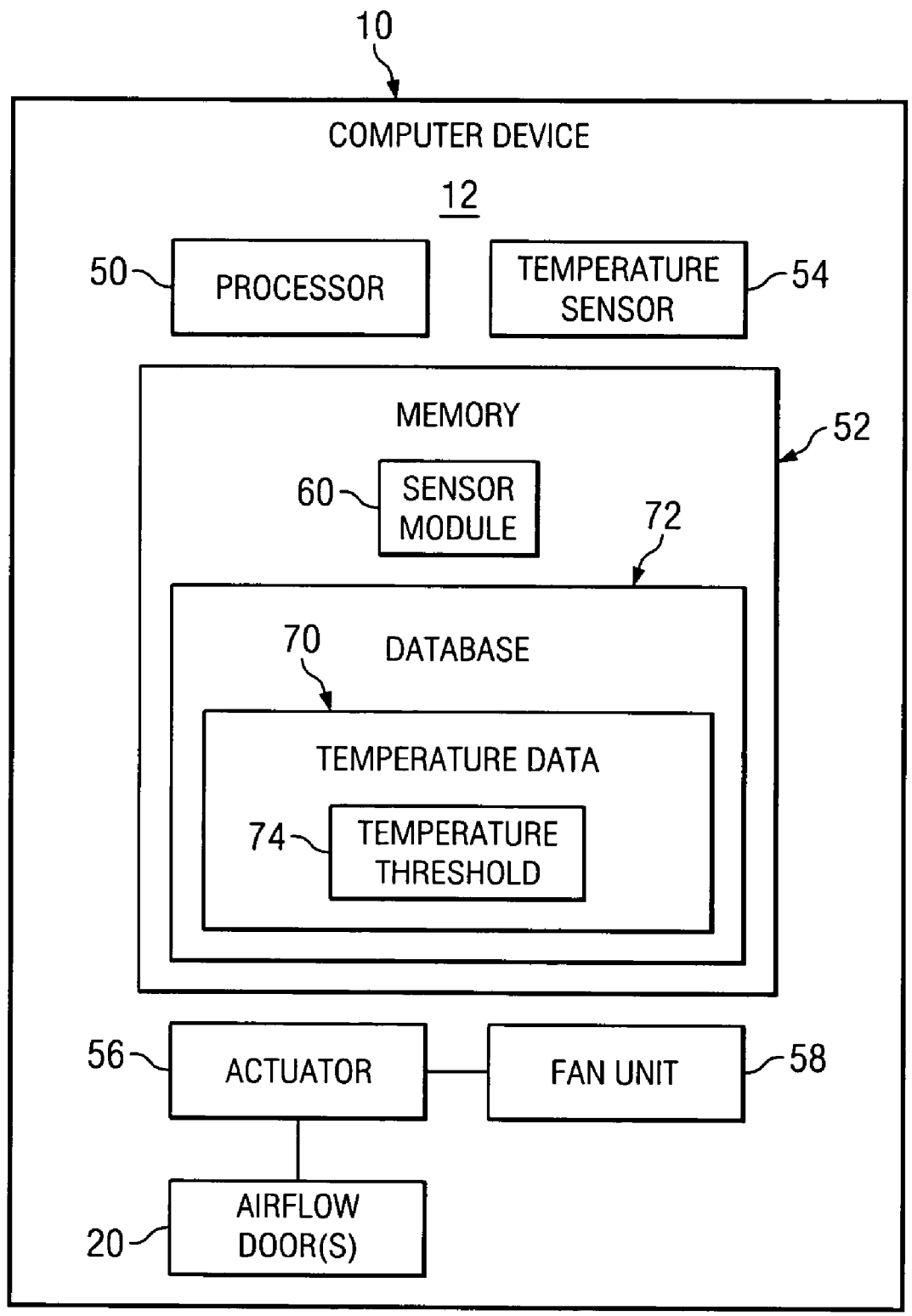
FIG. 3 is a block diagram illustrating a computer device incorporating an embodiment of a computer thermal dissipation system in accordance with the present invention.

The preferred embodiments of the present invention and the advantages thereof are best understood by referring to FIGS. 1-3 of the drawings, like numerals being used for like and corresponding parts of the various drawings.

FIG. 1 is a diagram illustrating a computer device 10 in which an embodiment of a computer thermal dissipation system 12 in accordance with the present invention is incorporated. In the embodiment illustrated in FIG. 1, computer device 10 comprises a notebook or laptop computer device 14 having a base member 16 and a display member 18 rotatably coupled to base member 16. In the embodiment illustrated in FIG. 1, system 12 comprises airflow doors 20 for dissipating thermal energy generated by or otherwise contained within base member 16.

In the embodiment illustrated in FIG. 1, airflow doors 20 are disposed on a surface 24 of base member 16. In the embodiment illustrated in FIG. 1, airflow doors 20 are disposed on an upper surface 24 of base member 16 located between a keyboard 26 and display member 18 to facilitate thermal energy dissipation (e.g., increased airflow circulation and/or less obstruction or impedance to an airflow). However, it should be understood that airflow doors 20 may be otherwise located on computer device 10 (e.g., on the side(s) and/or rear surface areas of base member 16). Additionally, in the embodiment illustrated in FIG. 1, two airflow doors 20 are illustrated as being disposed on base member 16. However, it should be understood that a greater or fewer quantity of airflow doors 20 may be used. Further, in the embodiment illustrated in FIG. 1, airflow doors 20 are configured to open outwardly toward side areas 30 of base member 16. However, it should be understood that airflow doors 20 may be otherwise configured to open in other directions.

FIG. 2A is a diagram illustrating an embodiment of system 12 in accordance with the present invention having airflow door 20 and display member 18 in a closed position relative to base member 16, and FIG. 2B is a diagram illustrating an embodiment of system 12 in accordance with the present invention having airflow door 20 and display member 18 in an open position relative to base member 16. In the embodiment illustrated in FIGS. 2A and 2B, airflow door 20 is rotatably coupled to base member 16 via a hinge assembly 36. However, it should be understood that airflow door 20 may be otherwise coupled to base member 16. For example, airflow door 20 may be rotatably coupled to base member 16 using other types of devices or airflow door 20 may coupled to base member 16 in other non-rotatable configurations (e.g., airflow door 20 may be slidably coupled to base member 16 to accommodate opening of airflow door 20 relative to base member 16 by sliding airflow door 20 relative to base member). In some embodiments of the present invention, hinge assembly 36 comprises a spring-type or spring-biased hinge assembly 36 such that upon opening of display member 18 relative to base member 16, airflow door 20 automatically extends upwardly to an open position, as illustrated in FIG. 2B. In such an embodiment of the present invention, system 12 also facilitates automatic closing of airflow door 20 relative to base member 16 upon closing of display member 18 relative to base member 16. In other embodiments of the present invention, hinge assembly 36 comprises a ratchet-type hinge element for facilitating various open positions of airflow door 20 (e.g., partially open positions to fully open). In some embodiments of the present invention, airflow door 20 is configured for automatic opening and/or closing (e.g., in response to opening/closing of display member 18 or actuation of motor or other type of actuation mechanism). However, in other embodiments of the present invention, airflow door 20 is configured for manual opening and/or closing by a user (e.g., at any time and/or in response to an indicator (e.g., a light or other type of audio and/or visual indicator) or other type of notice provided to a user by computer device 10). In the embodiment illustrated in FIGS. 1 and 2A-2B, system 12 also comprises a filter element 40 disposed within an opening 42 formed by an open airflow door 20 for filtering an airflow entering or exiting opening 42.

In operation, airflow door 20 is configured to open relative to base member 16 to form opening 42 relative to an interior area 44 of base member 16 to facilitate dissipation of thermal energy from within interior area 44. Dissipation of thermal energy from within interior area 44 may be performed convectively or may be performed by forcing or otherwise causing an airflow to pass inwardly or outwardly through opening 42 (e.g., by a fan unit).

FIG. 3 is a block diagram illustrating computer device 10 in which an embodiment of thermal dissipation system 12 in accordance with the present invention is incorporated. In the embodiment illustrated in FIG. 3, system 12 comprises a processor 50, a memory 52, a temperature sensor 54, an actuator 56, and a fan unit 58. In the embodiment illustrated in FIG. 3, system 12 also comprises a sensor module 60 which may comprise hardware, software, or a combination of hardware and software. In the embodiment illustrated in FIG. 3, sensor module 60 is illustrated as being stored in memory 52 as to be accessible and executable by processor 50.

In operation, temperature sensor 54 is disposed or otherwise located in or near interior area 44 of base member 16 to determine or otherwise detect temperature conditions within interior area 44 of base member 16. The temperature readings or measurements obtained by temperature sensor 54 are received by sensor module 60 and compared to temperature data 70 stored in a database 72 in memory 52. If a temperature measurement or reading detected by sensor 54 exceeds a predetermined temperature threshold 74, sensor module 60 interfaces with actuator 56 to cause or otherwise instruct actuator 56 to open airflow door(s) 20. For example, in some embodiments of the present invention, actuator 56 is coupled to, or may be otherwise formed as part of, hinge assembly 36 such that actuator 56 automatically opens airflow door(s) 20 in response to a signal from sensor module 60. In some embodiments of the present invention, sensor module 60 is configured to automatically close airflow door(s) 20 if a temperature within interior area 44 falls below temperature threshold 74. For example, if a temperature reading or measurement detected by temperature sensor 54 falls below temperature threshold 74, sensor module 60 interfaces with actuator 56 to cause airflow door(s) 20 to automatically close relative to base member 16.

In some embodiments of the present invention, sensor module 60 is also configured to automatically initiate or activate fan unit 58 upon opening of airflow door(s) 20 and/or in response to a temperature within interior area 44 exceeding temperature threshold 74. For example, in some embodiments of the present invention, sensor module 60 is adapted to interface with fan unit 58 either directly or via actuator 56 such that upon actuation of actuator 56 and opening of airflow door(s) 20, fan unit 58 is automatically activated to generate an airflow inwardly or outwardly through opening(s) 42 formed by airflow door(s) 20. In other embodiments of the present invention, sensor module 60 is adapted to interface with fan unit 58 either directly or indirectly to activate and/or deactivate fan unit 58 in response to temperature variations within interior area 44 and/or at predetermined time intervals. As described above, fan unit 58 may be configured to direct an airflow outwardly or inwardly through opening(s) 42. Further, in some embodiments of the present invention, fan unit 58 may be configured to draw an airflow inwardly through opening 42 relative to one airflow door 20 and discharge or exhaust the airflow through another airflow door 20. Thus, embodiments of the present invention enable dissipation of thermal energy from within interior area 44 convectively and/or via fan unit 58.

Thus, embodiments of the present invention enable cooling or dissipation of thermal energy from within base member 16 of computer device 10 via airflow door(s) 20. System 12 may be configured such that airflow door(s) 20 are configured as an airflow intake and/or exhaust. For example, in some embodiments of the present invention, one or more airflow doors 20 may be provided to facilitate convective thermal energy dissipation from within interior area 44 of base member 16. In other embodiments of the present invention, fan unit 58 facilitates thermal energy dissipation from within interior area 44 of base member 16 by providing or otherwise generating an airflow though opening(s) 42 formed by open airflow door(s) 20. As described above, system 12 may be configured to provide an airflow via fan unit 58 inwardly or outwardly through one or more openings 42 formed by open airflow doors 20. For example, system 12 may be configured to provide an airflow via fan unit 58 inwardly through an opening 42 formed by at least one airflow door 20 and exhaust the airflow through an opening 42 formed by at least one other airflow door 20. Airflow door(s) 20 may also be used in conjunction with other intake and/or exhaust vents formed in computer device 10.

Further, embodiments of the present invention provide enhanced cooling of computer device 10 and, in some embodiments of the present invention, increased fan efficiency. For example, in some embodiments of the present invention, airflow door(s) 20 may be located on computer device 10 in areas having greater access to volumetric-free air zones (e.g., away from the bottom of computer device 10 where airflow may be otherwise restricted), thereby providing enhanced cooling of computer device 10 and increasing fan efficiency for generating an airflow to cool computer device 10.

What is claimed is:

1. A computing device, comprising:
   a base member having a keyboard;
   a display member; and
   at least one airflow door located adjacent and separate from the keyboard on an upper surface of the base member and rotatably coupled to the base member by a hinge, the hinge biasing the at least one airflow door toward an open position to facilitate thermal energy dissipation from the base member, wherein the at least one airflow door is configured to automatically close in response to closing of the display member relative to the base member.

2. The computing device of claim 1, further comprising a sensor module adapted to automatically open the at least one airflow door in response to a temperature of an interior area of the base member exceeding a predetermined threshold.

3. The computing device of claim 1, wherein the at least one airflow door opens toward a side area of the computing device.

4. The computing device of claim 1, further comprising a fan unit.

5. The computing device of claim 1, further comprising a fan unit adapted to be automatically activated in response to opening the at least one airflow door.

6. The computing device of claim 1, further comprising a fan unit adapted to draw an airflow inwardly to an interior area of the base member via an opening formed by opening the at least one airflow door.

7. The computing device of claim 1, wherein the at least one airflow door is disposed between the keyboard disposed on the upper surface of the base member and the display member.

8. The computing device of claim 1, further comprising a filter element disposed within an opening formed by opening the at least one airflow door.

9. The computing device of claim 1, wherein the computing device is a laptop computer.

10. A computer device comprising:
a base member with a keyboard; and
at least one airflow door located on a surface of the base member and separate from the keyboard to provide an opening into an interior area of the base member and being rotatably coupled to the base member thereof by a hinge, the hinge biasing the at least one airflow door toward an open position, the at least one airflow door configured to automatically open in response to opening of a display member of the computer device relative to the base member.

11. The computer device of claim 10, further comprising a fan unit.

12. The computer device of claim 10, further comprising a fan unit adapted to draw an airflow into the interior area of the base member via the opening formed by opening the at least one airflow door.

13. The computer device of claim 10, further comprising a filter element disposed within an opening formed by opening the at least one airflow door.

14. The computer device of claim 10, wherein the at least one airflow door opens toward a side area of the computer device.

15. The computer device of claim 10, wherein the at least one airflow door is disposed between the keyboard disposed on the upper surface of the base member and the display member.

16. The computer device of claim 10, wherein the at least one airflow door is adapted to automatically close in response to closing of the display member relative to the base member.

17. A notebook computer, comprising:
a base member with a keyboard;
a display rotatably connected to the base member;
airflow door separate from the keyboard and disposed on an upper surface of the base member; and
a temperature sensor that detects a temperature within an interior area of the base member, wherein the airflow door automatically rotates at a hinge to open when the temperature exceeds a predetermined temperature threshold and automatically rotates at the hinge to close when the temperature falls below the predetermined threshold.

18. The notebook computer of claim 17, wherein the airflow door opens toward a side area of the base member.

19. The notebook computer of claim 17 further comprising:
a sensor module in communication with the sensor;
an actuator coupled to the hinge, wherein the sensor module interfaces with the actuator to cause the actuator to open and close the airflow door.

20. The notebook computer of claim 17 further comprising, a fan that automatically activates when the airflow door opens.

21. A computer thermal dissipation method, comprising:
determining a temperature within an interior of a computer device, the computer device having a base member rotatably coupled to a display member; and
automatically rotatably opening a spring-biased airflow door disposed on an upper surface of the base member adjacent a keyboard in response to the temperature exceeding a predetermined threshold, wherein the spring-biased airflow door is biased in an open position.

22. The method of claim 21, further comprising activating a fan unit in response to opening of the spring-biased airflow door.

23. The method of claim 21, further comprising drawing an airflow into an opening formed by opening the spring-biased airflow door.

24. The method of claim 21, further comprising automatically closing the spring-biased airflow door in response to closing of the display member relative to the base member.

25. The method of claim 21, further comprising filtering an airflow passing through an opening formed by opening the spring-biased airflow door.

26. The method of claim 21, further comprising drawing an airflow into the interior area via an opening formed by opening the spring-biased airflow door.

27. A computer thermal dissipation method, comprising:
automatically rotatably opening at least one spring-biased airflow door located on an upper surface of a base member of a computer device, the computer device having a keyboard on the base member and being coupled to a display member, in response to a temperature within an interior area of the base member exceeding a predetermined threshold, the at least one spring-biased airflow door disposed on the base member separate from the keyboard, the at least one spring-biased airflow door being biased in an open position.

28. The method of claim 27, further comprising activating a fan unit to draw an airflow through an opening formed by opening the at least one spring-biased airflow door.

29. The method of claim 27, further comprising automatically closing the at least one spring-biased airflow door in response to closing of the display member relative to the base member.

30. The method of claim 27, further comprising automatically closing the at least one spring-biased airflow door in response to the temperature falling below the predetermined threshold.

31. A computer device comprising:
a base member having a keyboard;
a display member; and
an airflow door disposed on an upper surface of the base member and separate from the keyboard and configured to be opened for enabling an airflow therethrough to facilitate thermal energy dissipation from the base member, the airflow door including a hinge for facilitating a plurality of different open positions.

32. The computer device of claim 31, wherein the airflow door is configured to automatically open in response to a temperature of an interior area of the base member exceeding a predetermined threshold.

33. The computer device of claim 31, further comprising a fan unit configured to be automatically activated in response to opening of the airflow door.

34. The computer device of claim 31, wherein the one airflow door is disposed between the keyboard disposed on the upper surface of the base member and the display member.

35. The computer device of claim 31, further comprising a filter element disposed within an opening formed by opening the airflow door.

36. A computer thermal dissipation system, comprising:
a computer device having a base member and a display member, the computer device having two separate airflow doors disposed on an upper surface of the base member, the two separate airflow doors openable to enable an airflow therethrough to facilitate thermal energy dissipation from the base member, the two separate airflow doors each including a hinge for facilitating a plurality of open positions for the two separate airflow doors; and a fan unit configured to be automatically activated in response to opening of the two separate airflow doors.

37. The system of claim 36, wherein the two separate airflow doors automatically open in response to a temperature of an interior area of the base member exceeding a predetermined threshold.

38. The system of claim 36, wherein the two separate airflow doors are disposed between a keyboard disposed on the upper surface of the base member and the display member.

39. A computer thermal dissipation system, comprising:
a computer device having a base member with a keyboard and a display member, the computer device having an airflow door disposed on an upper surface of the base member and being separate from the keyboard, the airflow door openable to enable an airflow therethrough to facilitate thermal energy dissipation from the base member, the airflow door including a hinge for facilitating a plurality of open positions for the airflow door; and
a filter element disposed within an opening formed by opening the airflow door for filtering the airflow.

40. The system of claim 39, wherein the airflow door is disposed between the keyboard disposed on the upper surface of the base member and the display member.

41. The system of claim 39, further comprising a fan unit configured to be automatically activated in response to opening of the airflow door.

42. A computer thermal dissipation system, comprising:
a computer device having a base member with a plurality of separate airflow doors located adjacent and separate from a keyboard on an upper surface of the base member, each of the plurality of airflow doors openable and closable relative to the base member, each of the airflow doors including a hinge for facilitating a plurality of open positions for each of the respective airflow doors;
a fan unit configured to draw an airflow into the base member via an opening formed by opening at least one of the plurality of airflow doors and exhaust the airflow through another opening formed by opening another of the plurality of airflow doors.

43. The system of claim 42, wherein the airflow doors is automatically open in response to opening of a display member coupled to the base member.

44. The system of claim 42, wherein the airflow doors is automatically open in response to a temperature within the base member exceeding a predetermined threshold.

45. The system of claim 42, wherein the a fan unit automatically activates in response to opening of the airflow doors.

46. The system of claim 42, wherein the airflow doors are disposed on the upper surface of the base member and are separate from a keyboard located on the base member.

47. The system of claim 42, wherein the airflow doors automatically close in response to closing of a display member of the computer device relative to the base member.

48. The system of claim 42, wherein the airflow doors is automatically close in response to a temperature within the base member decreasing to below a predetermined threshold.

49. The system of claim 42, further comprising a filter element disposed in at least one of the openings formed by the airflow doors.

* * * * *

UNITED STATES PATENT AND TRADEMARK OFFICE
CERTIFICATE OF CORRECTION

PATENT NO. : 7,871,319 B2  
APPLICATION NO. : 10/980029  
DATED : January 18, 2011  
INVENTOR(S) : Mark S. Tracy et al.

Page 1 of 1

It is certified that error appears in the above-identified patent and that said Letters Patent is hereby corrected as shown below:

In column 6, line 51, in Claim 34, delete "the one" and insert -- the --, therefor.

In column 8, line 7, in Claim 42, delete "the plurality of airflow" and insert -- the airflow --, therefor.

In column 8, line 9, in Claim 42, delete "the plurality of airflow" and insert -- the airflow --, therefor.

In column 8, line 10, in Claim 43, delete "doors is" and insert -- doors --, therefor.

In column 8, line 13, in Claim 44, delete "doors is" and insert -- doors --, therefor.

In column 8, line 16, in Claim 45, delete "the a" and insert -- the --, therefor, In column 8, line 25, in Claim 48, delete "doors is" and insert -- doors --, therefor.

Signed and Sealed this
Twenty-sixth Day of April, 2011

David J. Kappos
*Director of the United States Patent and Trademark Office*